United States Patent [19]
Kuwabara

[11] Patent Number: 5,805,679
[45] Date of Patent: Sep. 8, 1998

[54] COMMUNICATION DEVICE WITH AUTOMATIC SIGNAL DISCRIMINATION AND METHOD THEREFOR

[75] Inventor: Kazuhiro Kuwabara, Handa, Japan

[73] Assignee: Brother Kogyo Kabushiki Kaisha, Aichi-Ken, Japan

[21] Appl. No.: 623,415

[22] Filed: Mar. 28, 1996

[30] Foreign Application Priority Data

Mar. 30, 1995 [JP] Japan ................................ 7-073222

[51] Int. Cl.$^6$ ................................................ H04M 11/00
[52] U.S. Cl. ........................ 379/100.15; 379/93.34; 379/100.06
[58] Field of Search .................... 379/100, 142, 379/96–99, 93, 100.01, 100.05, 100.06, 100.12, 100.15–100.17, 93.01, 93.17, 93.28–93.34, 93.26; 358/400, 434–440, 442, 468, 443

[56] References Cited

U.S. PATENT DOCUMENTS 5,323,451  6/1994  Yatsunami .............................. 379/100
5,517,557  5/1996  Tanaka .................................... 379/100
5,600,712  2/1997  Hanson et al. ......................... 379/142

FOREIGN PATENT DOCUMENTS 7-240826  9/1995  Japan .................................... 379/98

*Primary Examiner*—Wing F. Chan
*Attorney, Agent, or Firm*—Kane, Dalsimer, Sullivan, Kurucz, Levy, Eisele and Richard, LPP

[57] ABSTRACT

A facsimile device stores a list of a caller ID (i.e., telephone number of the calling station) and a signal reception procedure to be used for receiving signal transmitted from the calling station. If the signal reception procedure on the list does not correspond to the transmitted signal, an appropriate reception procedure is determined based on the transmitted signal, and the list is updated. The updated list is used for the next calling from the calling station. If the calling station is not on the list, the signal reception procedure is determined based on the transmitted signal, and the telephone number and corresponding reception procedure is registered in the list.

20 Claims, 10 Drawing Sheets

COMMUNICATION DEVICE WITH AUTOMATIC SIGNAL DISCRIMINATION AND METHOD THEREFOR

BACKGROUND OF THE INVENTION

The present invention relates to a communication device which is capable of receiving the telephone number of a calling station which is transmitted from a telephone exchange.

Conventionally, a communication device which is capable of carrying out a facsimile transmission and a telephone transmission with use of a single cable is known. Such a device is operable in a facsimile/telephone switch mode (hereinafter referred to as an F/T mode) in which, depending on whether the calling station performs the facsimile transmission or the telephone transmission, one of facsimile reception procedure or a telephone reception procedure is selected.

In the F/T mode, once a calling signal reaches a communicating device of a called station, the communicating device connects the line, and starts transmitting/receiving signals according to a predetermined protocol. At this time, the communicating device generates calling signal (ringer tone) at the called station, and at the same time, the device transmits ring back tone to the calling station through the connected line.

If the communicating device receives a CNG (CalliNG tone) signal which is regarded as a calling signal of the facsimile transmission, then the device starts the facsimile reception procedure. If a handset of the calling station is off-hooked in response to the ring back tone, then the device executes the telephone reception procedure. If the device does not receive the CNG signal, and the calling station is not off-hooked for a predetermined period even if the ring back tone is transmitted, the device determines that the calling station is carrying out the facsimile transmission. In this case, if the calling station is performing the telephone transmission, since the facsimile transmission procedure is executed in the called station, the communication is not established and the transmission ends.

If the calling station has a device only for the telephone transmission and not for the facsimile transmission, when the called station receives the signal in the F/T mode, since the existence of the CNG signal is examined, the line should be connected before the communication is established, and the telephone fee is charged to the calling station. Specifically, in such a situation, the calling tone (ringer tone) is generated in the called station, and the ring back tone is transmitted to the calling station.

If an operator of the called station is away from the communicating device, the ringer tone is kept ringing for certain period without being off-hooked, and the calling station should wait for the period. As described above, if the predetermined period has passed with this status, the facsimile reception procedure starts in the called station, and then the calling station gives up the communication and disconnects the line. In this case, even though the communication has not been established, the telephone fee will be charged.

If the device has a reception mode list which has correspondence between the telephone numbers of the calling stations and the kinds of transmissions (i.e., the facsimile or the telephone transmission), and the list is referred to in accordance with the telephone number of the calling station transmitted from the telephone exchange, the procedure to be carried out can be determined quickly, and above problem can be avoided.

In such a device, however, an operator of the device has to prepare the list for use in advance. If the list is not well prepared, the function may not be used effectively. Further, if the correspondence of the telephone numbers and the reception modes have changed, the operator must update the list according to the change, which requires a troublesome work.

SUMMARY OF THE INVENTION

It is therefore an object of the invention to provide an improved communication device which can select the appropriate signal reception procedure, does not require the operator to input/update data, and further can preventing the calling station from being charged.

For the above object, according to the invention, there is provided a method for determining one of a plurality of signal reception procedures to be used in a communicating device, the communicating device being capable of receiving identifying data signal which identifies a calling station, and communication signal including facsimile transmission signal and/or telephone transmission signal, the communicating device storing data identifying a plurality of calling stations and corresponding signal reception procedures to be executed for receiving signal transmitted from respective calling stations, the method comprising steps of receiving the identifying data, selecting one of signal reception procedures to be used for receiving communication signal transmitted from the calling station based on the identifying data signal, starting the selected signal reception procedure, determining another signal receiving procedure based on the communication signal transmitted from the calling station if the selected signal reception procedure does not correspond to the communication signal, storing data identifying the calling station and the another signal receiving procedure if the selected signal reception procedure does not correspond to the communication signal and the determining step determines the another signal reception procedure.

According to the method, in response to the calling signal (i.e., prior to reception of the communication signal), the signal reception procedure to be executed can be determined without examining the transmitted communication signal.

Optionally, the communicating device is operable in an on-hook status and in an off-hook status, and the communicating device receives the identifying data signal in the on-hook status, and operates in the off-hook status when a signal reception procedure is started. Therefore, the telephone fee is not charged to the calling station before the communication is established.

It is possible to execute the another signal reception procedure as soon as it is determined. Therefore, even if the firstly determined reception procedure does not correspond to the transmitted signal, alternative procedure is executed and the transmitted signal can be received safely.

Optionally, the plurality of signal reception procedures have a first procedure for receiving only a facsimile transmission signal, a second procedure for receiving telephone transmission signal, and third procedure capable of receiving the communication signal after determining whether the communication signal is the facsimile transmission signal or the telephone transmission signal.

The method further has a step of receiving the communication signal with the third procedure if the receiving step fails to receive the identifying data signal. Therefore, even if the telephone number of the calling station is not received, the transmitted data can be received with use of an appropriate signal receiving procedure.

If the selected signal reception procedure is the first procedure and the communication signal is the telephone transmission signal, the determining step determines that the another signal reception procedure is the third procedure.

If the selected signal reception procedure is the third procedure and the communication signal is the facsimile transmission signal, the determining step determines that the another signal reception procedure is the first procedure.

If the selected signal reception procedure is the third procedure and the communication signal is the telephone transmission signal, the determining step determines that the another signal reception procedure is the second procedure.

If the selected signal reception procedure is the second procedure and the communication signal is the facsimile transmission signal, the determining step determines that the another signal reception procedure is the third procedure.

According to another aspect of the invention, there is provided a method for determining one of a plurality of signal reception procedures to be used in a communicating device, the communicating device being capable of receiving an identifying data signal which identifies a calling station, and a communication signal including facsimile transmission signal and/or telephone transmission signal, the communicating device storing data identifying a plurality of calling stations and corresponding signal reception procedures to be executed for receiving the communication signals transmitted from respective calling stations, the method comprising steps of receiving the identifying data, selecting one of signal reception procedures to be used for receiving a communication signal transmitted from the calling station based on the identifying data signal, starting the selected signal reception procedure, canceling stored combination of the data identifying the calling station and corresponding signal receiving procedure.

According to the method described above, inappropriate data can be deleted, and therefore wrong reception procedure will not be selected repeatedly.

Further, the canceling step further comprises a step of updating the combination of the data identifying the calling station and the corresponding signal receiving procedure. Therefore, even if a signal reception procedure which does not correspond to the transmitted signal is selected once, another procedure which corresponds to the transmitted signal will be selected when the calling is made by the same calling station in the future.

According to further aspect of the invention, there is provided a communicating device for exchanging communication signal including facsimile transmission signal and/or telephone transmission signal with another device, comprising means for receiving a identifying data signal which identifies a calling station, means for storing identifying data of a plurality of calling stations and respective signal reception procedures to be used for receiving the communication data transmitted from corresponding calling stations, means for selecting a signal reception procedure in accordance with the identifying data signal received by the receiving means and data stored in the storing means, means for executing the signal reception procedure selected by the selecting means, means for examining whether the signal reception procedure selected by the selecting means meets the communication signal transmitted from the calling station, means for determining another signal reception procedure corresponding to the communication signal transmitted from the calling station, means for updating the data stored in the storing means, if the examining means determined that the selected signal reception procedure selected by the selecting means does not correspond to the communication signal, in accordance with the identifying data and the another signal reception procedure determined by said determining means.

DESCRIPTION OF THE ACCOMPANYING DRAWINGS

DESCRIPTION OF THE EMBODIMENT

Figure 1:
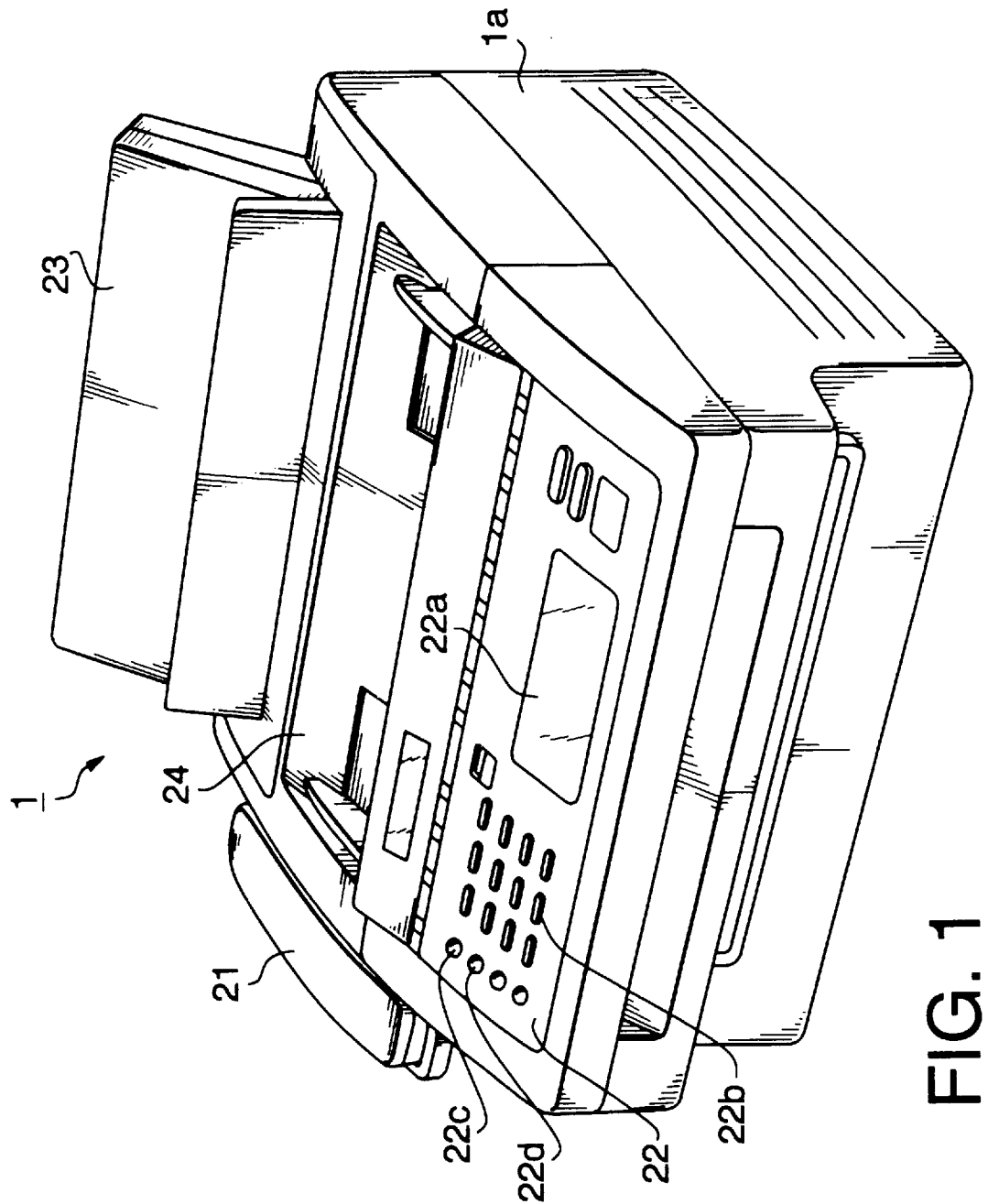
FIG. 1 is a perspective view of a facsimile device embodying the invention.
Figure 2:
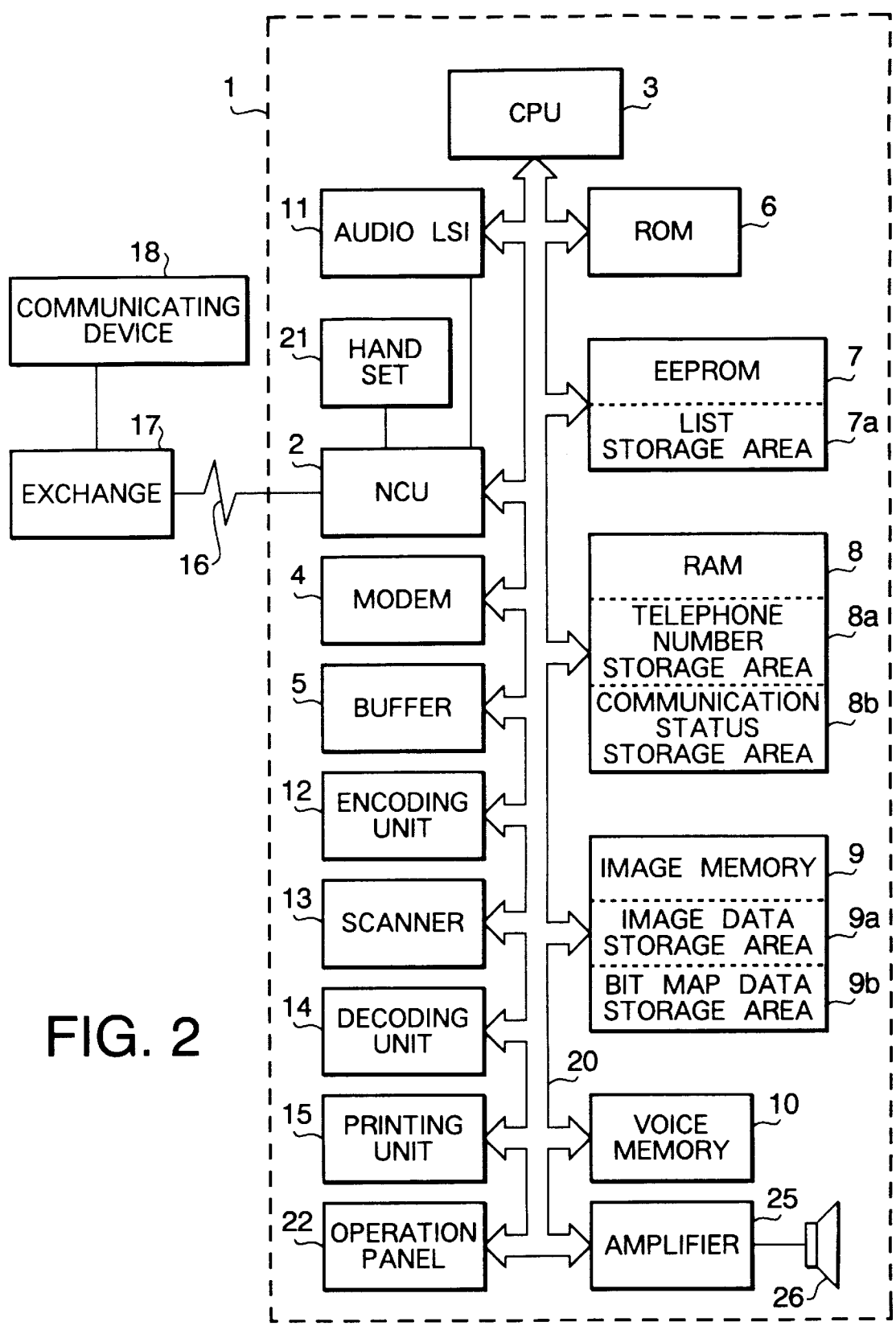
FIG. 2 is a block diagram of the facsimile device of FIG. 1.

FIG. 1 is a perspective view of a facsimile device 1 embodying the present invention, and FIG. 2 is a block diagram illustrating the control system of the facsimile device 1.

On a side wall of the main body 1a of the facsimile device 1, a handset 21 is mounted. On the front side of the top surface of the body 1a, an operation panel 22 is provided. On the backward part of the top surface of the body 1a, a cassette receptor 23 is formed for receiving a cassette tray (not shown) accommodating a stuck of recording sheet. At the center of the top surface of the body 1a, an original document tray on which original documents are to be placed is provided.

As shown in FIG. 2, the facsimile device 1 has an NCU (Network Control Unit) 2, a CPU (Central Processing Unit) 3, a MODEM (MOdulator-DEModulator) 4, a buffer 5, a ROM (Read Only Memory) 6, an EEPROM (Electrically-Erasable programmable ROM) 7, a RAM (Random Access Memory) 8, an image memory 9, a voice memory 10, an audio LSI (Large-Scale Integration) 11, an encoding unit 12, a scanner 13, a decoding unit 14, a printer unit 14, the operation panel 22, an amplifier 25 and a speaker 26, which are connected with each other through a bus line 20.

The CPU 3 controls each unit connected through the bus line 20 in accordance with the signal transmitted/received by means of the NCU 2 to operate the facsimile device as a facsimile or a telephone.

The MODEM 4 encodes image data to be transmitted, and decodes received image data, and also transmits/receives various command signals. The buffer 5 temporarily stores the encoded image data to be exchanged between an external communication device 18.

The ROM 6 stores control programs to be executed by the CPU 3. The EEPROM 7 is a memory for storing various setting parameters, and also has an area 7a for storing a list of the telephone numbers of calling stations and the corresponding transmission modes. The RAM 8 is a memory for temporarily storing the various data to be used when the facsimile device 1 operates. The RAM 8 has a telephone number storage area 8a for storing the telephone number of a calling station transmitted from the telephone exchange 17, and a communication status storage area 8b for storing the communication status of the telephone line.

The image memory 9 is a dynamic RAM (DRAM) having a image data storage area 9a, a bit map data storage area 9b for storing a bit map data for printing. The voice memory 10 is a DRAM for storing OGM (OutGoing Message) which is a message to be transmitted to the calling station, and an ICM (InComing Message) which is a message transmitted from the calling station.

The audio LSI 11 converts the analog signal received through the NCU 2 into a digital audio signal, and also converts the digital audio signal into the analog audio signal and outputs the same to the NCU 2.

The encoding unit 12 carries out the encoding of the image data to be transmitted. The scanner 13 is for reading image data from the original documents placed on the original document tray 24. The decoding unit 14 is for reading out the data stored in the image data storage area 9a of the image memory 9 and decodes the same for the use of recording (printing).

The printing unit 15 is for printing the received image data data on the recording sheet. For example, in the recording unit, a photoconductive material is exposed to laser beam and a latent image is formed thereon. Then, the latent image is developed by applying toner and a toner image is formed, and the toner image is transferred and fixed onto the recording sheet in accordance with an electrophotographic image forming method. The image data may be compressed with a run-length method.

The operation panel 22 has a display 22a for displaying operation status of the facsimile device 1, and various keys for operation, such as ten keys 22b, a communication key 22c, function keys 22d, and the like.

The amplifier 25 is for amplifying the calling signal or the reproduced ICM to drive the speaker 26.

The facsimile device 1 is connected to the telephone line 16 through the NCU 2. The telephone line 16 is connected to the telephone exchange 17, and further connected to another communicating device 18 through another telephone line.

In the facsimile device 1, when another communicating device 18 makes a call, a calling signal is received through the telephone exchange 17. If the owner of the both communicating devices 1 and 18 are registered as subscribers of a caller ID system (a system where the telephone number of the calling station is transmitted to the called station), information related to the calling station is transmitted to the called station through the telephone exchange 17 in a non-signal period between two subsequent ringer signals (calling signals).

The operation of the facsimile device 1 will be described below.

When the facsimile data is received, the facsimile device 1 is connected to another communication device 18 through the telephone exchange 17, the telephone line 16, and the NCU 2. The CPU 3 controls the facsimile device 1 to exchange signals according to a predetermined protocol with the communication device 18 (see FIG. 3).

Figure 3:
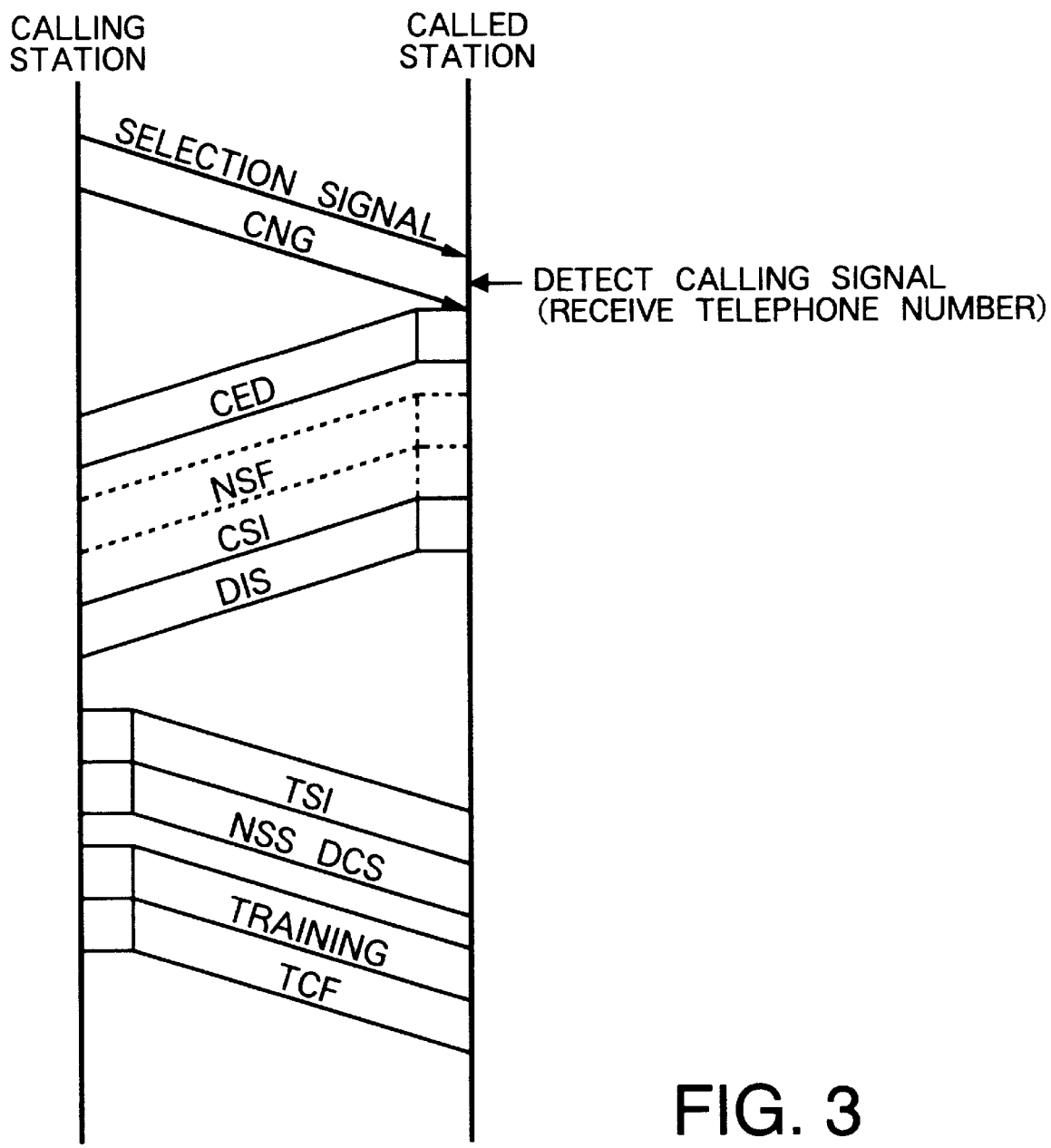
FIG. 3 is a chart showing signal exchange between a calling station and a called station.

In FIG. 3, firstly, the selection signal is transmitted from the calling station to the called station. Then, the CNG signal is transmitted to the called station. In response to the CNG signal, the called station transmits a CED (called station identification) signal to the calling station. Further the called station transmits an NSF (non-standard facilities) signal, a CSI (called subscriber identification) signal, and a DIS (digital identification signal) to the calling station. The calling station, responsive to the reception of above signals, transmits a TSI (transmitting subscriber identification) signal, an NSS (non-standard facilities set-up) signal, a DCS (digital command signal) to the called station. Further, the calling station transmits a training signal which is followed by a TCF (training check) signal to the called station.

Then, after communication has been established with the communication in accordance with the above protocol, the CPU 3 receives a predetermined amount of data (facsimile data) transmitted from the communication device 18 and stores the received data in the buffer 5. The stored data is an encoded (compressed) data, and therefore the data is decoded (expanded) by the decoding unit 14, and then developed to a bit map image data in the bit image storage area 9b of the image memory 9 on a page basis. The bit map image in the image storage area 9b is further developed in accordance with a predetermined resolution, and then sent to the printing unit 15 to be printed on a page basis.

The data stored in the buffer 5 is cleared after the data is developed in the bit image storage area 9b, and the predetermined amount of the following part of the facsimile data is stored in the buffer 5. The bit map image storage area 9b is also cleared when the data is transmitted to the printer unit 15, and the bit map data corresponding to the following data is stored therein. In this way, the printing unit 15 records the image corresponding to the transmitted facsimile data. Recording is done such that image data carried by the predetermined amount of data is printed at a time, and as the printing procedure proceeds, the image corresponding to the entire facsimile data is printed.

If the facsimile data is firstly to be received in a memory, the compressed image data (i.e., facsimile data) is stored in the image data storage area 9a of the image memory 9 as is, and the stored data is expanded (developed into a bit map data) when printing is performed.

When the facsimile data is to be transmitted (sent) to another communication device, the original document is read with use of the scanner 13, the output data of the scanner 13 is compressed at the encoding unit 12, and the encoded data is transmitted through the NCU 2 to another communication device 18. If the facsimile data is to be once stored in a memory and then transmitted, the original is scanned with the scanner 13, the image data is encoded and then stored in the image data storage area 9a of the image memory 9. The CPU 3 starts transmitting the data stored in the storage area 9a of the image memory 9 at the appointed time.

When the telephone transmission is received, if the CPU 3 detects that the ringer tone signal (calling signal) through the NCU 2, the CPU 3 outputs a predetermined ringer tone (calling tone) through the amplifier 25 and the speaker 26. If the CPU 3 detects that the handset 21 is picked up during the ringer tone is ringing at the facsimile device 1 of the called station, the CPU 3 controls the NCU 2 to connect the telephone line so that the telephone transmission is allowed through the handset 21 of the facsimile device 1. After the handset 21 is on-hooked, the CPU 3 controls the NCU 2 to disconnect the line.

When the telephone transmission is sent (telephone call is made at the facsimile device 1), the CPU 3 detects the handset 21 of the facsimile device 1 is off-hooked through the NCU 2, and then the CPU 3 outputs a selection signal (dial number signal) to the NCU 2 in accordance with the operation of the ten keys 22b on the operation panel 22. The selection signal is transmitted, through the NCU 2 and the telephone line 16, to the telephone exchange 17, and the calling of the communication device 18 corresponding to the selection signal is made.

Figure 4:
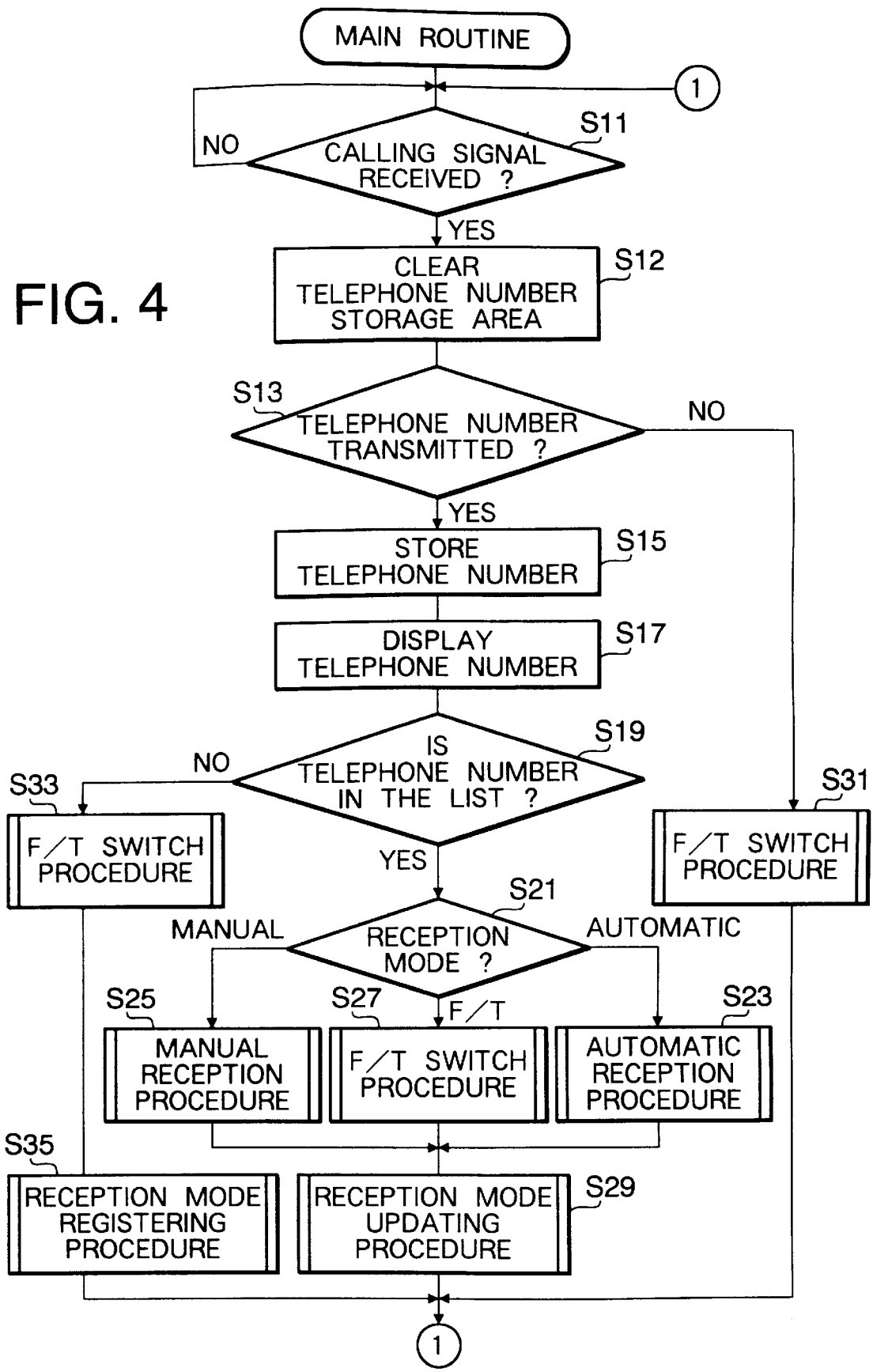
FIG. 4 is a flowchart illustrating a main routine executed by the CPU of the facsimile device.

FIG. 4 is a flowchart illustrating a main routine executed by the CPU 3.

The procedure shown in FIG. 4 starts when a power switch (not shown) of the facsimile device 1 is turned ON. When the main routine starts, whether the ringer tone signal (calling signal) from another communication device 18 is received is determined (S11). If the ringer tone signal is not received (NO:S11), control goes back to S11. If the ringer tone signal is received (YES:S11), the calling station telephone number storage area 8a of the RAM 8 is cleared (S12), and then whether the telephone number of the calling station is transmitted from the telephone exchange 17 is determined (S13). If the telephone number of the calling station is not transmitted (NO:S13), the CPU 3 executes an F/T switch procedure, which will be described later, and the control goes back to S11.

If the telephone number of the calling station is transmitted from the telephone exchange 17 (YES:S13), the telephone number of the calling station is temporarily stored in the calling station telephone number storage area 8a (S15), and the number is displayed on the display 22a (S17). Then, the CPU 3 examines whether the number stored in the calling station telephone number storage area 8a is stored in the list storage area 7a of the EEPROM 7 (S19). If the telephone number is not stored in the EEPROM 7 (NO:S19), the CPU 3 executes the F/T switch procedure (S33), an reception mode registering procedure (S35), and then control goes back to S11.

If the telephone number stored in the calling station telephone number storage area 8a is stored in the list storage area 7a of the EEPROM 7 (YES:S19), the CPU 3 determines one of the automatic reception mode, manual reception mode, or F/T switch mode with reference to the reception mode list (which will be described later) at S21, and the CPU 3 executes the procedure corresponding to the determined reception mode (S23, S25 or S27). Then, the CPU 3 executes a reception mode updating procedure (S29), and control goes back to S11.

The automatic reception procedure which is referred to at S23 of the main routine (FIG. 4) is described with reference to FIG. 5.

In this automatic reception procedure, a telephone transmission flag and the facsimile transmission flag are cleared (S41), the line is connected (S43), and a facsimile reception procedure is started (S45).

Figure 6:
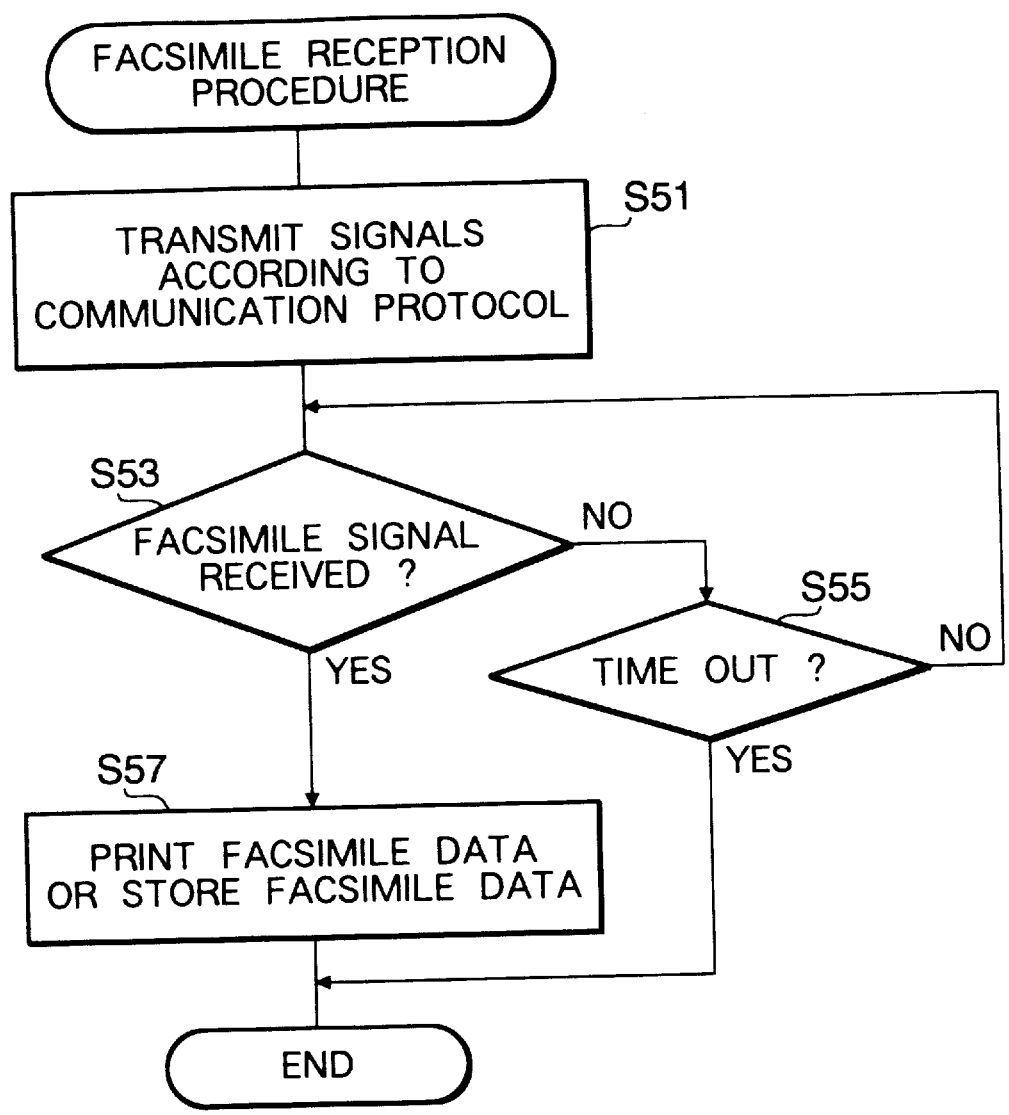
FIG. 6 shows a flowchart illustrating a facsimile reception procedure.

The facsimile reception procedure is shown in FIG. 6. In the facsimile reception procedure, signals such as a CED signal are transmitted to the communication device 18 of the calling station in accordance with the predetermined communication protocol (S51). Then whether the signals in accordance with the predetermined communication protocol, such as a TSI signal, facsimile data signal and the like, is received is determined (S53). If such signals have not been received (NO:S53), whether a predetermined period has passed is determined (S55). If the predetermined period has not passed (NO:S55), control goes back to S53. If the predetermined period has passed (YES:S55) without receiving the facsimile data signal, the facsimile reception procedure is finished.

If the facsimile data signal is received from the calling station (YES:S53), the facsimile data is received and printed on the recording sheet or stored in the image data storage area 9a of the memory 9 (S57), and the facsimile reception procedure is finished. The printing operation and the data storing operation are carried out as described above.

Figure 5:
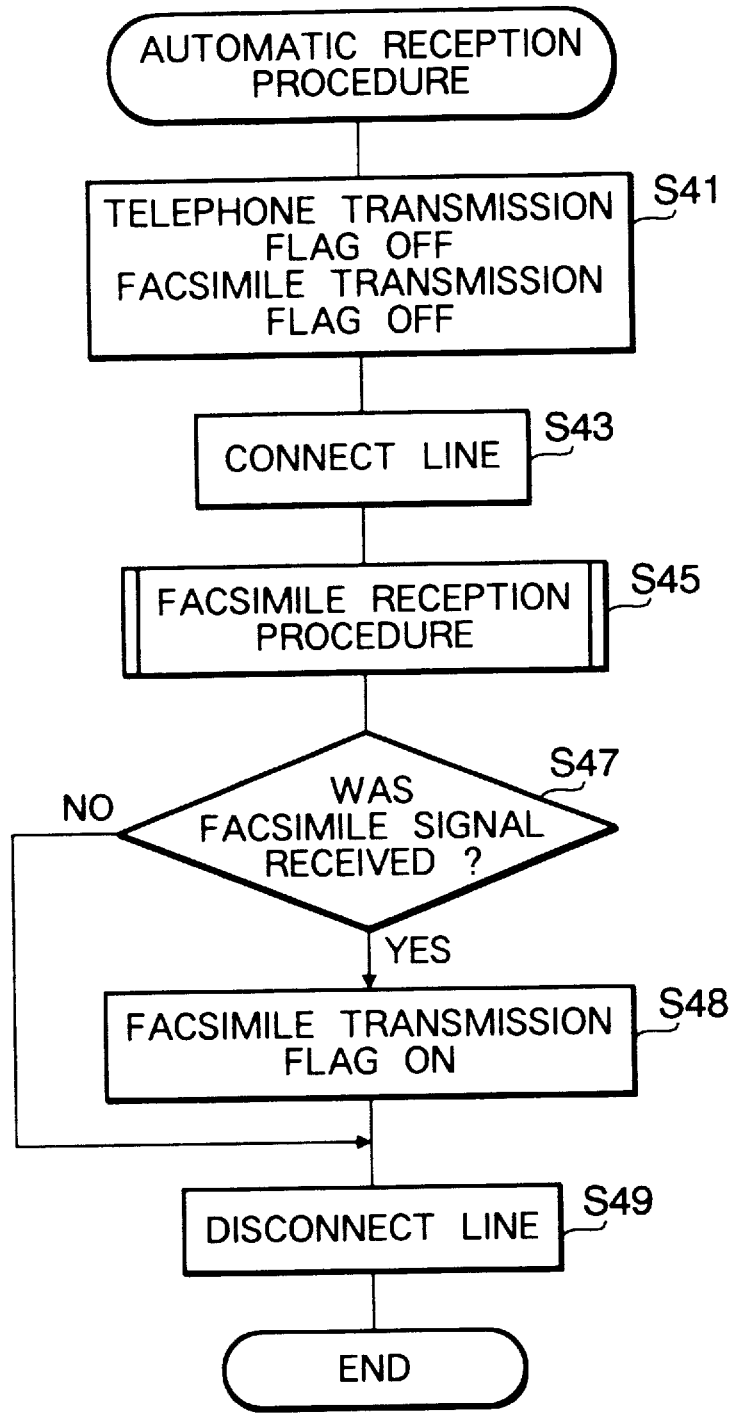
FIG. 5 shows a flowchart illustrating an automatic reception procedure.

In FIG. 5, after the facsimile reception procedure is finished at S45, whether facsimile data signal is transmitted from the communication device 18 of the calling station is determined (S47). If the facsimile data signal has not been transmitted (NO:S47), the line is disconnected, and the automatic reception procedure is finished. If the facsimile signal has been transmitted (YES:S47), the facsimile transmission flag in the communication status storing area 8b of the RAM 8 is set ON (S48), the line is disconnected (S49), and the procedure is finished.

Figure 7:
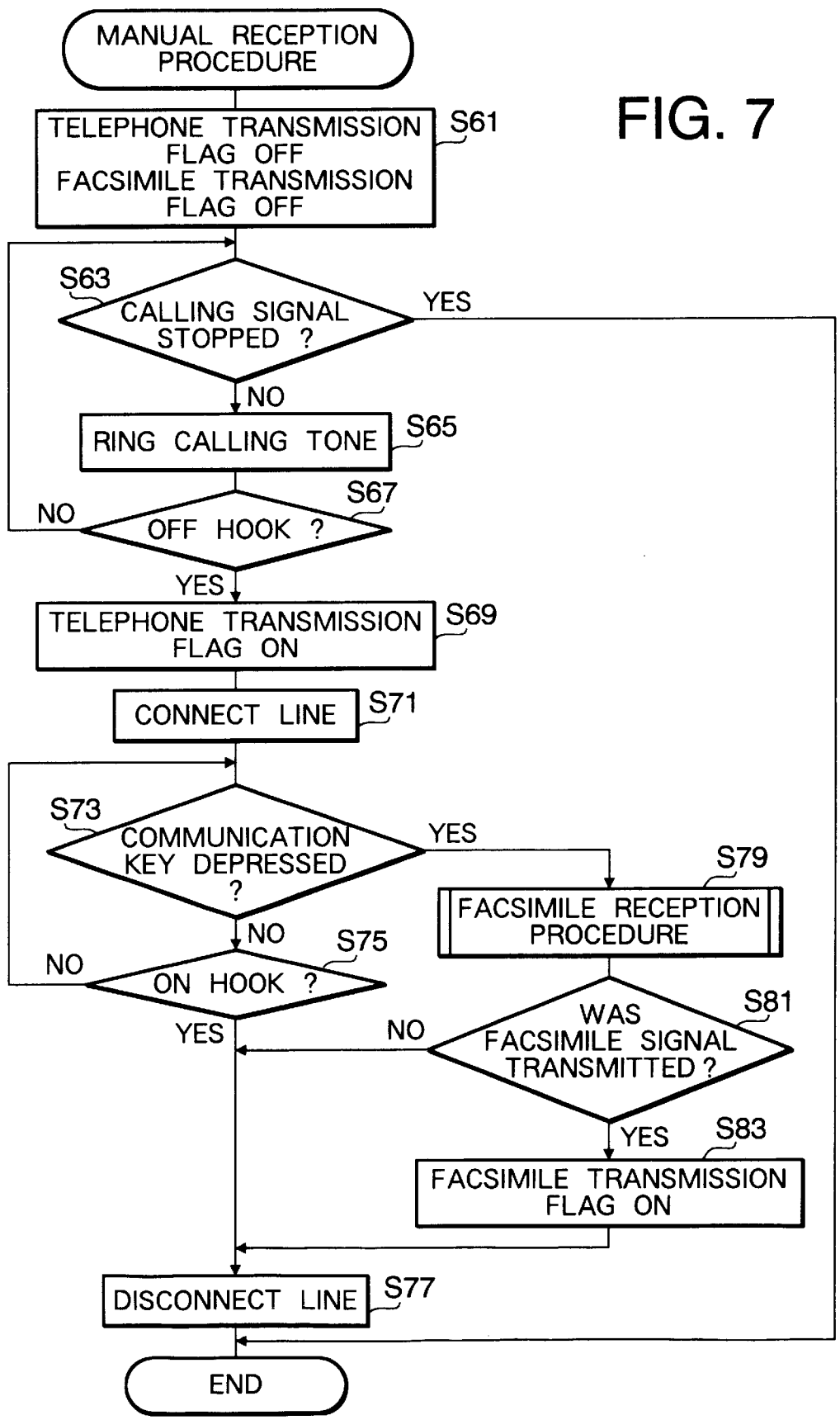
FIG. 7 shows a flowchart illustrating a manual reception procedure.

The manual reception procedure will be described with reference to FIG. 7.

When the manual reception procedure starts, the telephone transmission flag and the facsimile transmission flag of the communication status storing area 8b of the RAM 8 are set OFF (S61), and then whether the calling signal transmitted from the communication device 18 of the calling station is stopped (S63) is determined. If the calling signal stopped (YES:S63), it is determined that the line was disconnected at the calling station, and the manual reception procedure is finished.

If the calling signal of the communication device 18 of the calling station has not stopped (NO:S63), the ringer tone (calling tone) is output (i.e., made ringing) through the amplifier 25 and the speaker 26 (S65). In S67, whether the handset 21 of the facsimile device 1 is off-hooked or not is determined. If the handset 21 is not off-hooked (NO:S67), control goes back to S63. If the handset 21 is off-hooked (YES:S67), the telephone transmission flag in the communication status storing area 8b is set ON (S69), and the line is connected (S71).

In S73, whether communication key 22c for starting facsimile reception is depressed is determined. If the communication key 22c is depressed (YES:S73), the facsimile reception procedure shown in FIG. 6 is performed (S79), and whether the facsimile signal is transmitted from the calling station is determined (S81). If the facsimile signal is transmitted from the communicating device 18 of the calling station (YES:S81), the facsimile transmission flag is set ON (S83), the line is disconnected (S77), and the manual reception procedure is finished. If the facsimile signal has not been transmitted (NO:S81) from the communicating device 18 of the calling station, the line is disconnected (S77), and the manual reception procedure is finished.

If the communication key is not depressed (NO:S73), whether the handset 21 is on-hooked is determined (S75). If the handset 21 is not on-hooked (NO:S75), control goes back to S73. If the handset 21 is on-hooked (YES:S75), then the line is disconnected and the manual reception procedure is finished.

Figure 8:
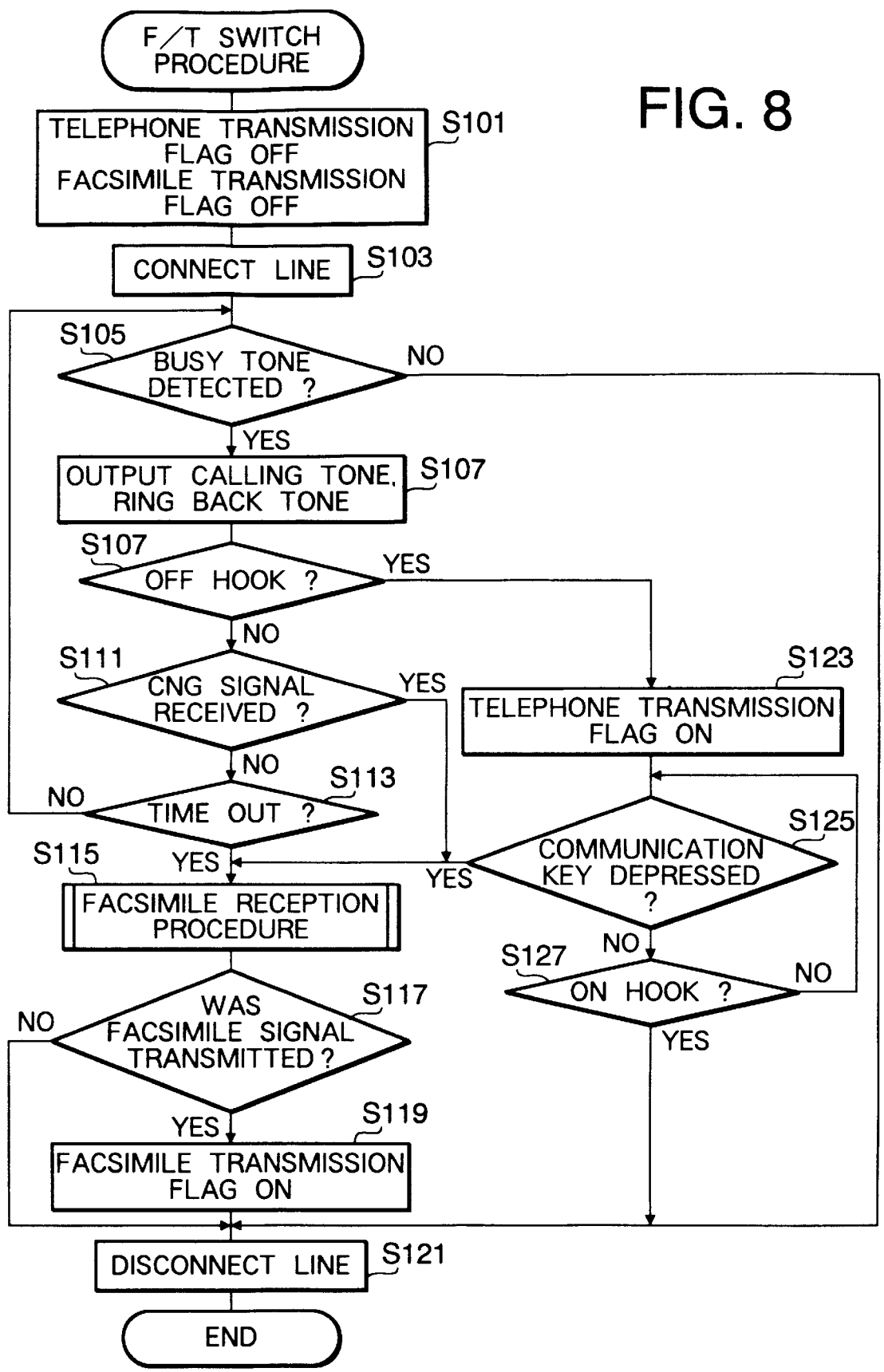
FIG. 8 shows a flowchart illustrating an F/T switch procedure.

FIG. 8 shows a flowchart of the F/T switch procedure.

At S101, the telephone transmission flag and the facsimile transmission flag stored in the communication status storing area 8b of the RAM 8 are cleared (set OFF), and the line is connected (S103). In S105, whether a busy tone is detected is determined (S105). If the line is disconnected at the calling station, the busy tone is detected. If the busy tone is detected (YES:S105), the line is disconnected also at the facsimile device 1 (S121), and the F/T procedure is finished.

If the busy tone is not detected (NO:S105), the ringer tone (calling tone) is output (made ring) through the amplifier 25 and the speaker 26 at the called station, and the ring back tone is transmitted to the calling station (S107). In S109, whether the handset 21 of the facsimile device 1 is off-hooked is determined. If the handset 21 is off-hooked (YES:S109), the telephone transmission flag stored in the communication status storing area 8b of the RAM 8 is set ON (S123), and whether the communication key 22c is pressed is determined (S125). If the communication key 22c is depressed (YES:S125) control goes to S115. If the communication key 22c is not depressed (NO:S125), whether the handset 21 is on-hooked is determined (S127). If the handset 21 is not on-hooked (NO:S127), control goes back to S125. If the handset 21 is on-hooked (YES:S127), the line is disconnected (S121), and the F/T switch procedure is finished.

If the handset 21 is not off-hooked at S109, whether CNG signal is received is determined (S111). If the CNG signal is not received (NO:S111), whether a predetermined period has passed since the F/T switch procedure started (S113). If the predetermined period has not yet passed (NO:S113) control goes back to S105. If the CNG signal is received at S111, or if the predetermined period has passed since the F/T switch procedure started (YES:S113), the facsimile reception procedure shown in FIG. 6 is executed (S115).

In S117, whether the facsimile signal was transmitted from the calling station at S115 is determined. If the facsimile signal was not transmitted from the calling station (NO:S117), the line is disconnected (S121), and the F/T switch procedure is finished. If the facsimile signal was received from the calling station (YES:S117) during the facsimile reception procedure at S115, the facsimile transmission flag in the communication status area 8b of the RAM 8 is set ON (S119), the line is disconnected (S121), and the F/T switch procedure is finished.

Figure 9:
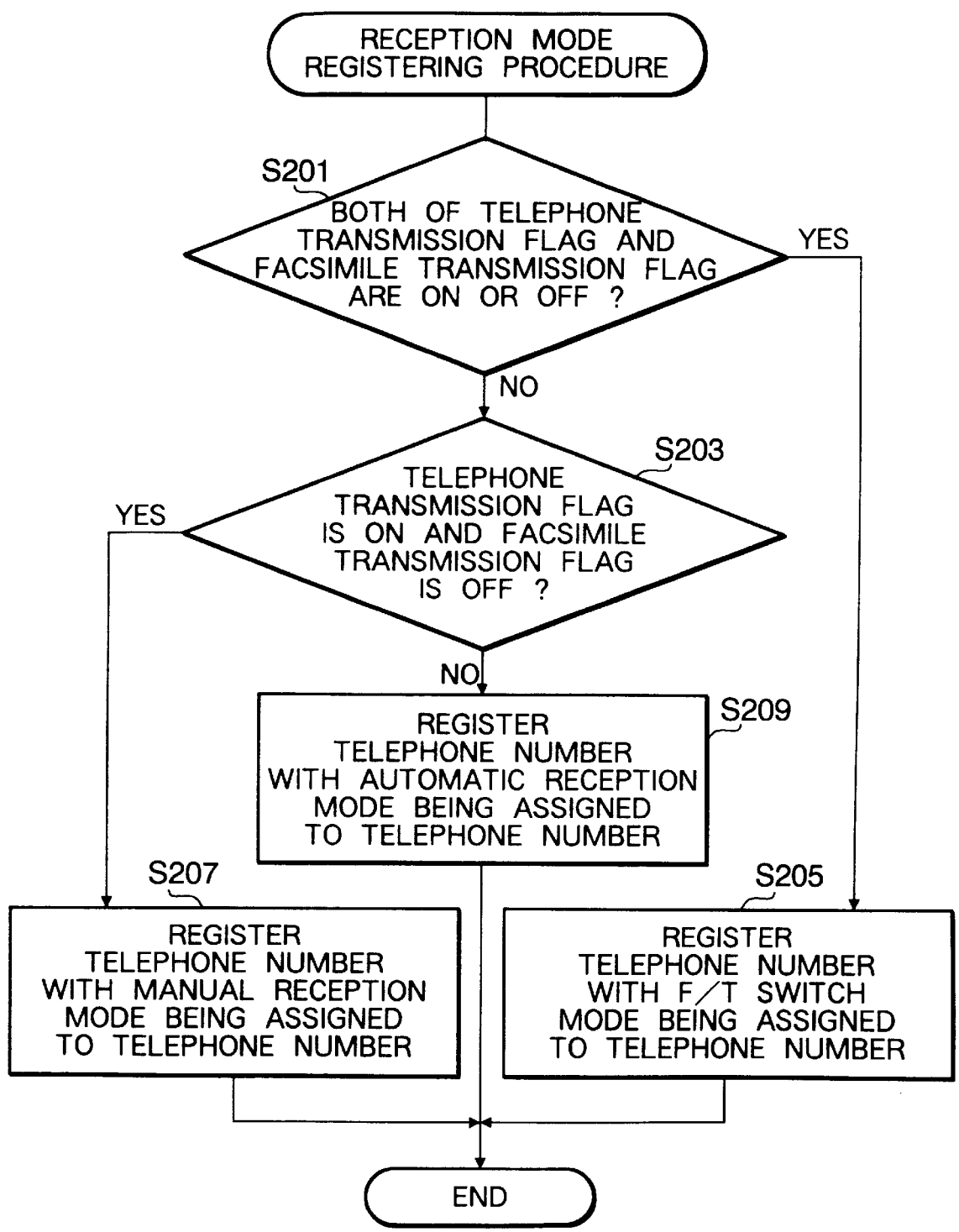
FIG. 9 shows a reception mode registering procedure.

FIG. 9 shows a flowchart of the reception mode registering procedure which is executed at S33 of FIG. 4.

In the reception mode registering procedure, whether the telephone transmission flag and the facsimile transmission flag stored in the communication status storing area 8b of the RAM 8 are checked (S201). If both of the telephone transmission flag and the facsimile transmission flag are ON, or both of them are OFF (YES:S201), the F/T switch mode is assigned to the telephone number stored in the telephone number storing are 8a of the RAM 8 (S205), and the telephone number and the corresponding F/T switch mode are registered, or added to the reception mode list which is stored in the list storage area 7a of the EEPROM 7.

If one of the facsimile transmission flag and the telephone transmission flag is ON and the other is OFF (NO:S201), then which of the facsimile transmission flag and the telephone transmission flag is ON is determined (S203).

If the telephone transmission flag is ON and the facsimile transmission flag is OFF (YES:S203), the manual reception mode is assigned to the telephone number stored in the telephone number storing are 8a of the RAM 8 (S207), and the telephone number and the corresponding mode (i.e., the manual reception mode) are added to the list which is stored in the list storage area 7a of the EEPROM 7.

If the telephone transmission flag is OFF and the facsimile transmission flag is ON (NO:S203), the automatic reception mode is assigned to the telephone number stored in the telephone number storing are 8a of the RAM 8 (S209), and the telephone number and the corresponding mode (i.e., the automatic reception mode) are added to the list which is stored in the list storage area 7a of the EEPROM 7.

After the telephone number and the corresponding reception mode are added to the list stored in the list storage area 7a of the EEPROM 7, the reception mode registering procedure is finished.

Figure 10:
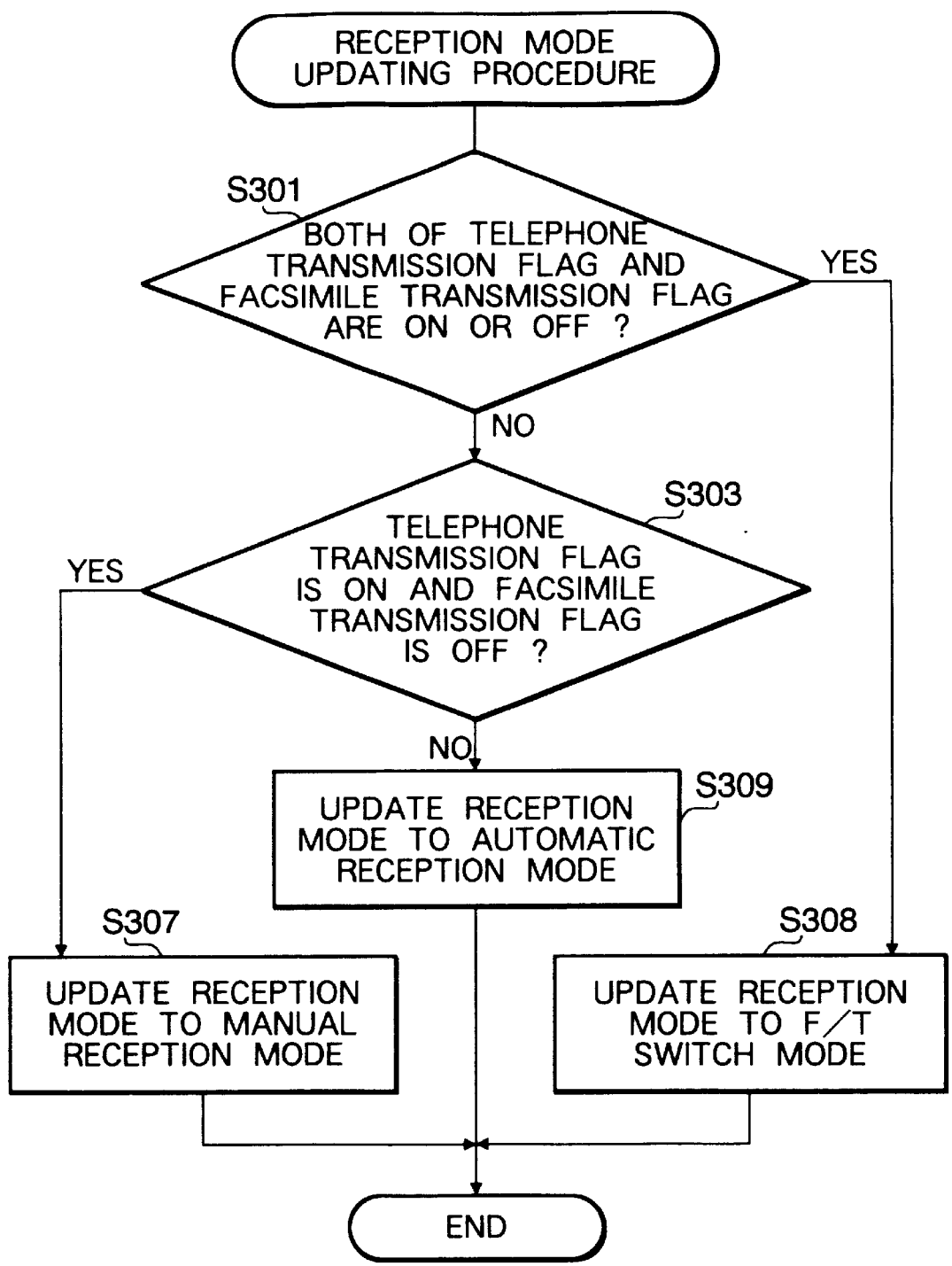
FIG. 10 shows a flowchart illustrating reception mode updating procedure.

FIG. 10 shows a flowchart of the reception mode updating procedure which is called as S29 of FIG. 4.

In the reception mode updating procedure, whether the telephone transmission flag and the facsimile transmission flag stored in the communication status storing area 8b of the RAM 8 are checked (S301). If both of the flags are ON, or both of them are OFF (YES:S301), the reception mode assigned to the telephone number in the reception mode list is updated to the F/T switch mode (S305).

If one of the facsimile transmission flag and the telephone transmission flag is ON and the other is OFF (NO:S301), which of the facsimile transmission flag and the telephone transmission flag is ON is determined (S303).

If the telephone transmission flag is ON and the facsimile transmission flag is OFF (YES:S303), the reception mode assigned to the telephone number in the reception mode list is updated to the manual reception mode (S307).

If the telephone transmission flag is OFF and the facsimile transmission flag is ON (NO:S303), the reception mode assigned to the telephone number in the reception mode list is updated to the automatic reception mode (S309).

After the reception mode in the reception mode list is updated, the reception mode updating procedure is finished.

In the reception mode updating procedure, the list is updated. It is also possible that the combination of the telephone number and the reception procedure which does not correspond to the transmitted signal is canceled or deleted from the list. If the telephone number is deleted from the list, when a call is made by the same calling station in the future, the transmission is received with use of the F/T switch procedure, and the appropriate reception mode is determined. The appropriate reception procedure thus determined is registered in the list during the reception mode registering procedure.

When the main routine shown in FIG. 4 is executed, the reception mode list as shown below is formed in the list storage area 7a of the EEPROM 7.

If the telephone number of the calling station which is transmitted from the telephone exchange 17 has already been stored in the list storage area 7a of the EEPROM 7, the reception mode corresponding to the telephone number is updated in accordance with the reception mode currently used.

TABLE 1

Reception Mode List

| telephone No. | Reception Mode |
| --- | --- |
| 111222333 | automatic reception mode |
| 444555666 | manual reception mode |
| 777888999 | automatic reception mode |
| 123456789 | F/T switch reception mode |
| 987654321 | manual reception mode |

If the telephone number of the calling station which is transmitted from the telephone exchange 17 has not been stored in the list storage area 7a of the EEPROM 7, the telephone number and the reception mode determined to be used in accordance with the requirement of the calling station are registered in the reception mode list.

Table 2 shows the relationships between the mode receptions, the facsimile transmission flag, the telephone transmission flag, and the updated reception modes.

TABLE 2

| Reception Mode on the mode list (& corresponding procedure) | Facsimile Transmission Flag | Telephone Transmission Flag | Updated Mode or Registered Mode |
|---|---|---|---|
| automatic reception mode (automatic reception procedure) | 0 1 | 0 0 | F/T switch mode automatic mode |
| manual reception mode (manual reception procedure) reception procedure) | 0 0 1 | 0 1 1 | F/T switch mode manual mode F/T switch mode |
| F/T switch reception mode* (F/T reception procedure) | 0 0 1 1 | 0 1 0 1 | F/T switch mode manual mode automatic mode F/T switch mode |

*Including the case where the number of the calling station is not on the reception mode list When the telephone number transmitted from the telephone exchange 17 is stored in the list storage area 7a of the EEPROM 7, if the reception mode corresponding to the telephone number is the automatic reception mode, and if the calling station does not send the facsimile signal to the called station, the list is updated such that the F/T switch mode is assigned to the telephone number.

If the mode corresponding to the telephone number is the manual reception mode, and the calling station disconnects the line for sends the facsimile data to the called station, the F/T switch mode is assigned to the telephone number.

If the mode corresponding to the telephone number is the F/T switch mode, and the calling station only transmits telephone transmission, the manual reception mode is assigned to the number.

If the mode corresponding to the telephone number is the F/T switch mode, and the calling station transmits facsimile data, the automatic reception mode is assigned to the number.

When the telephone number transmitted form the telephone exchange 17 is not on the reception mode list in the list storage area 7a of the EEPROM 7, if the calling station performs only the telephone transmission, the manual reception mode is assigned to the number. If the calling station sends only the facsimile data, the automatic reception mode is assigned to the number. If the calling station disconnects the line, or sends the telephone transmission and the facsimile data to the called station, the F/T switch reception mode is assigned to the telephone number. The modes as assigned and the telephone numbers are stored in the list storage area 7a of the EEPROM 7.

According to the invention, the reception mode can be determined immediately, based on the list of the telephone numbers and the corresponding reception modes, in response to the reception of the telephone number transmitted from the telephone exchange. The calling station will not be charged during determining the reception mode except when the F/T switch mode is selected.

Further, if the telephone number transmitted from the telephone exchange is not on the reception mode list, the telephone number and the corresponding reception mode are added to the list automatically.

If the reception mode corresponding to a certain telephone number of the calling station, which is on the list, has been changed, the list is automatically updated when the transmission is made by the calling station.

The invention is not limited to the above described specific form, but may be modified in any other forms without departing from the essential characteristics thereof.

What is claimed is:

1. A method for determining one of a plurality of signal reception procedures to be used in a communicating device, said communicating device being capable of receiving identifying data signal which identifies a calling station, and communication signal including facsimile transmission signal and/or telephone transmission signal, said communicating device storing data identifying a plurality of calling stations and corresponding signal reception procedures to be executed for receiving signal transmitted from respective calling stations, said method comprising steps of:

receiving said identifying data;

selecting one of signal reception procedures to be used for receiving communication signal transmitted from said calling station based on said identifying data signal;

starting said selected signal reception procedure;

examining whether said signal reception procedure selected corresponds to said communication signal transmitted from said calling station;

determining another signal receiving procedure based on said communication signal transmitted from said calling station if said selected signal reception procedure does not correspond to said communication signal;

storing data identifying said calling station and said another signal receiving procedure if said selected signal reception procedure does not correspond to said communication signal and said determining step determines said another signal reception procedure.

2. The method according to claim 1, wherein said communicating device is operable in an on-hook status and in an off-hook status, said communicating device receives said identifying data signal in said on-hook status, and operates in said off-hook status when a signal reception procedure is started.

3. The method according to claim 1, wherein said determining step further comprises a step of executing said another signal reception procedure.

4. The method according to claim 2, wherein said plurality of signal reception procedures comprise a first procedure for receiving only a facsimile transmission signal, a second procedure for receiving telephone transmission signal, and third procedure capable of receiving said communication signal after determining whether said communication signal is said facsimile transmission signal or said telephone transmission signal.

5. The method according to claim 4, further comprising step of receiving said communication signal with said third procedure if said receiving step fails to receive said identifying data signal.

6. The method according to claim 4, wherein if said selected signal reception procedure is said first procedure and said communication signal is said telephone transmission signal, said determining step determines that said another signal reception procedure is said third procedure.

7. The method according to claim 4, wherein if said selected signal reception procedure is said third procedure and said communication signal is said facsimile transmission signal, said determining step determines that said another signal reception procedure is said first procedure.

8. The method according to claim 4,
wherein if said selected signal reception procedure is said third procedure and said communication signal is said telephone transmission signal, said determining step determines that said another signal reception procedure is said second procedure.

9. The method according to claim 4,
wherein if said selected signal reception procedure is said second procedure and said communication signal is said facsimile transmission signal, said determining step determines that said another signal reception procedure is said third procedure.

10. A method for determining one of a plurality of signal reception procedures to be used in a communicating device, said communicating device being capable of receiving an identifying data signal which identifies a calling station and a communication signal including facsimile transmission signal and/or telephone transmission signal, said communicating device storing data identifying a plurality of calling stations and corresponding signal reception procedures to be executed for receiving said communication signals transmitted from respective calling stations, said method comprising steps of:

receiving said identifying data;

selecting one of signal reception procedures to be used for receiving a communication signal transmitted from said calling station based on said identifying data signal;

starting said selected signal reception procedure;

canceling stored combination of said data identifying said calling station and corresponding signal receiving procedure;

updating said stored combination of said data identifying said calling station and said corresponding signal receiving procedure in accordance with said communication signal transmitted from said calling station.

11. The method according to claims 10, wherein said communicating device is operable either of in an on-hook status and in an off-hook status, said communicating device receives said identifying data signal in said on-hook status, and operates in said off-hook status when a signal reception procedure is started.

12. A communicating device for exchanging communication signal including facsimile transmission signal and/or telephone transmission signal with another device, comprising:

means for receiving a identifying data signal which identifies a calling station;

means for storing identifying data of a plurality of calling stations and respective signal reception procedures to be used for receiving said communication data transmitted from corresponding calling stations;

means for selecting a signal reception procedure in accordance with said identifying data signal received by said receiving means and data stored in said storing means;

means for executing said signal reception procedure selected by said selecting means;

means for examining whether said signal reception procedure selected by said selecting means meets said communication signal transmitted from said calling station;

means for determining another signal reception procedure corresponding to said communication signal transmitted from said calling station;

means for updating said data stored in said storing means, if said examining means determined that said selected signal reception procedure selected by said selecting means does not correspond to said communication signal, in accordance with said identifying data and said another signal reception procedure determined by said determining means.

13. The communicating device according to 12,
wherein said determining means executes said determined another signal reception procedure.

14. The communicating device according to 12,
wherein said communicating device is operable either in an on-hook status and in an off-hook status, said receiving means receives said identifying data signal in said on-hook status, and operates in said off-hook status when a signal reception procedure is started.

15. The communicating device according to 14,
wherein said plurality of signal reception procedures comprise a first procedure for receiving only a facsimile transmission signal, a second procedure for receiving telephone transmission signal, and third procedure capable of receiving said communication signal after determining whether said communication signal is said facsimile transmission signal or said telephone transmission signal.

16. The communicating device according to 15,
wherein if said selected signal reception procedure is said second procedure and said communication signal is said facsimile transmission signal, said determining means determines that said another signal reception procedure is said third procedure.

17. The communicating device according to 15,
further comprising means for receiving said communication signal with said third procedure if said receiving means fails to receive said identifying data signal.

18. The communicating device according to 15,
wherein if said selected signal reception procedure is said first procedure and said communication signal is said telephone transmission signal, said determining means determines that said another signal reception procedure is said third procedure.

19. The communicating device according to 15,
wherein if said selected signal reception procedure is said third procedure and said communication signal is said facsimile transmission signal, said determining means determines that said another signal reception procedure is said first procedure.

20. The communicating device according to 15,
wherein if said selected signal reception procedure is said third procedure and said communication signal is said telephone transmission signal, said determining step determines that said another signal reception procedure is said second procedure.

* * * * *